US009817862B2

(12) United States Patent
Ganapathi et al.

(10) Patent No.: US 9,817,862 B2
(45) Date of Patent: *Nov. 14, 2017

(54) ASSOCIATING METADATA WITH RESULTS PRODUCED BY APPLYING A PIPELINED SEARCH COMMAND TO MACHINE DATA IN TIMESTAMPED EVENTS

(71) Applicant: Splunk Inc., San Francisco, CA (US)

(72) Inventors: Archana Sulochana Ganapathi, Palo Alto, CA (US); Alice Emily Neels, San Francisco, CA (US); Marc Vincent Robichaud, San Francisco, CA (US); Stephen Phillip Sorkin, San Francisco, CA (US); Steve Yu Zhang, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/834,361

(22) Filed: Aug. 24, 2015

(65) Prior Publication Data

US 2015/0363460 A1    Dec. 17, 2015

Related U.S. Application Data

(63) Continuation of application No. 14/068,651, filed on Oct. 31, 2013, now Pat. No. 9,152,682, which is a continuation of application No. 13/756,105, filed on Jan. 31, 2013, now Pat. No. 8,583,631.

(51) Int. Cl.
G06F 17/30 (2006.01)
(52) U.S. Cl.
CPC .. *G06F 17/30395* (2013.01); *G06F 17/30424* (2013.01); *G06F 17/30477* (2013.01); *G06F 17/30554* (2013.01)

(58) Field of Classification Search
USPC .................. 707/722, 705, 756; 715/174–178
See application file for complete search history.

(56) References Cited

U.S. PATENT DOCUMENTS

| 5,226,118 A | 7/1993 | Baker et al. |
|---|---|---|
| 6,532,427 B1 | 3/2003 | Joshi et al. |
| 7,680,781 B1 | 3/2010 | Wasserman et al. |
| 8,122,007 B2 | 2/2012 | Mayer et al. |

(Continued)

OTHER PUBLICATIONS

Carasso, David, "Exploring Splunk—Search Processing Lanaguage (SPL) Primer and Cookbook," 156 pages, Apr. 2012.

*Primary Examiner* — Hung T Vy
(74) *Attorney, Agent, or Firm* — Perkins Coie LLP

(57) ABSTRACT

Embodiments are directed towards determining and tracking metadata for the generation of visualizations of requested data. A user may request data by providing a query that may be employed to search for the requested data. The query may include a plurality of commands, which may be employed in a pipeline to perform the search and to generate a table of the requested data. In some embodiments, each command may be executed to perform an action on a set of data. The execution of a command may generate one or more columns to append and/or insert into the table of requested data. Metadata for each generated column may be determined based on the actions performed by executing the commands. The table of requested data and the column metadata may be employed to generate and display a visualization of at least a portion of the requested data to a user.

30 Claims, 13 Drawing Sheets

(56) References Cited

U.S. PATENT DOCUMENTS

| | | |
|---|---|---|
| 8,583,631 B1 | 11/2013 | Ganapathi et al. |
| 8,799,299 B2 | 8/2014 | Carroll et al. |
| 2003/0046292 A1 | 3/2003 | Subramanian et al. |
| 2005/0108209 A1 | 5/2005 | Beyer et al. |
| 2007/0040094 A1 | 2/2007 | Smith et al. |
| 2008/0071769 A1 | 3/2008 | Jagannathan |
| 2009/0150367 A1 | 6/2009 | Melnik et al. |
| 2011/0246415 A1 | 10/2011 | Li et al. |
| 2011/0295865 A1 | 12/2011 | Carroll et al. |
| 2012/0089610 A1 | 4/2012 | Agrawal et al. |

|  | 802 | 804 | 806 |
|---|---|---|---|
| 808 | Sales Person | Region | Sales |
|  | Cary | NE | 8 |
|  | Cary | NW | 2 |
|  | Cary | SE | 5 |
|  | Cary | SW | 40 |
|  | Marc | NE | 12 |
|  | Marc | NW | 13 |
|  | Marc | SE | 15 |
|  | Marc | SW | 48 |
|  | Phil | NE | 13 |
|  | Phil | NW | 78 |
|  | Phil | SE | 45 |
|  | Phil | SW | 55 |
|  | Sara | NE | 25 |
|  | Sara | NW | 86 |
|  | Sara | SE | 60 |
|  | Sara | SW | 89 |

| Sales Person | Region | Sales | Monday | Tuesday | Wednesday | Thursday | Friday |
|---|---|---|---|---|---|---|---|
| Cary | NE | 8 | 1 | 1 | 2 | 0 | 4 |
| Cary | NW | 2 | 0 | 0 | 0 | 2 | 0 |
| Cary | SE | 5 | 4 | 1 | 0 | 0 | 0 |
| Cary | SW | 40 | 11 | 20 | 4 | 2 | 3 |
| Marc | NE | 12 | 9 | 2 | 1 | 0 | 0 |
| Marc | NW | 13 | 0 | 0 | 0 | 13 | 0 |
| Marc | SE | 15 | 2 | 5 | 3 | 1 | 4 |
| Marc | SW | 48 | 22 | 23 | 0 | 3 | 0 |
| Phil | NE | 13 | 6 | 0 | 6 | 1 | 0 |
| Phil | NW | 78 | 2 | 6 | 25 | 17 | 28 |
| Phil | SE | 45 | 7 | 9 | 14 | 0 | 15 |
| Phil | SW | 55 | 39 | 4 | 0 | 1 | 11 |
| Sara | NE | 25 | 6 | 0 | 2 | 16 | 1 |
| Sara | NW | 86 | 14 | 24 | 17 | 30 | 1 |
| Sara | SE | 60 | 20 | 21 | 3 | 14 | 2 |
| Sara | SW | 89 | 16 | 17 | 19 | 14 | 23 |

*FIG. 8B*

```
<constraints(root)> | <extractions(root)> | eval node_name = <name(root)>
    | ifpipe <constraints(childof(root,0))> [<extractions(childof(root,0))> | eval node_name = mvappend(node_name,
name(childof(root, 0))>]
        | ifpipe <constraints(childof(childof(root,0),0))> [<extractions(childof(childof(root, 0),0))>]
= mvappend(node_name, name(childof(childof(root, 0),0))>]
    | ifpipe <constraints(childof(root,1))> [<extractions(childof(root,1)>> | eval node_name = mvappend(node_name,
name(childof(root, 1))>]
    | ifpipe <constraints(childof(root,2))> [<extractions(childof(root,2)>> | eval node_name = mvappend(node_name,
name(childof(root, 2))>]
```

ASSOCIATING METADATA WITH RESULTS PRODUCED BY APPLYING A PIPELINED SEARCH COMMAND TO MACHINE DATA IN TIMESTAMPED EVENTS

CROSS-REFERENCE OF RELATED APPLICATIONS

This application is a continuation of U.S. patent application Ser. No. 14/068,651, filed on Oct. 31, 2013, now allowed; which is a continuation of U.S. patent application Ser. No. 13/756,105, filed on Jan. 31, 2013, issued as U.S. Pat. No. 8,583,631 on Nov. 12, 2013; both of which are hereby incorporated by reference in their entirety for all purposes.

TECHNICAL FIELD

The present invention relates generally to data presentation management, and more particularly, but not exclusively, to determining and tracking metadata for visualization of data tables.

BACKGROUND

The rapid increase in the production and collection of machine-generated data has created large data sets that are difficult to search and/or otherwise analyze. The machine data can include sequences of time stamped records that may occur in one or more usually continuous streams. Further, machine data often represents activity made up of discrete records or events. Often, search engines may retrieve data from various data sources, which may include different types of data. However, generating a graphical visualization of the requested data may provide undesired results due to the type of visualization and/or the data retrieved by the search engine. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIGS. 8A-8B illustrate non-exhaustive examples of use case embodiments of tables with column metadata generated based on a query for requested data;

FIG. 10 illustrates a non-exhaustive example of a code fragment of a query with a plurality of pipeline commands.

DETAILED DESCRIPTION

Figure 1:
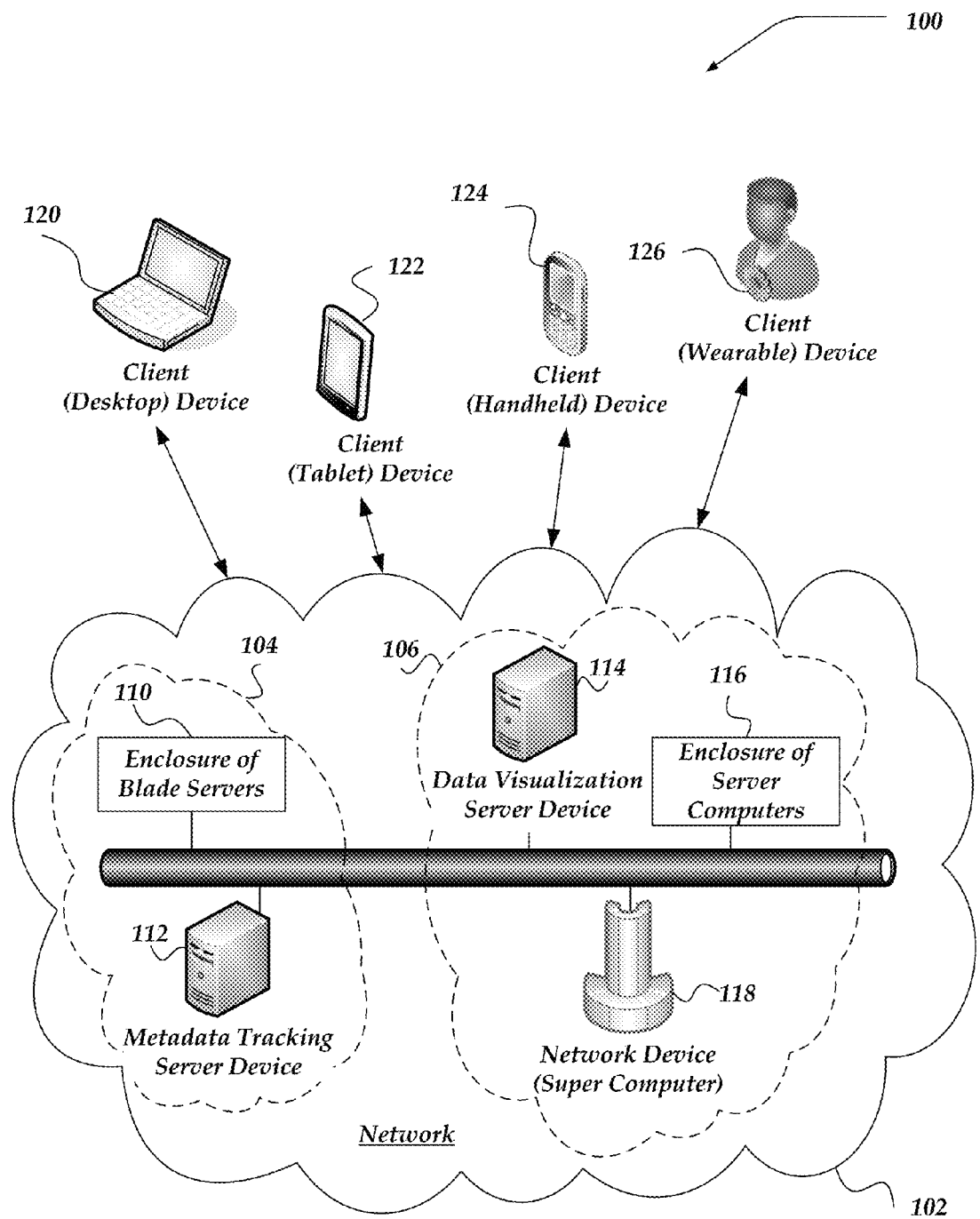
FIG. 1 illustrates a system environment in which various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include data generated by machines, including, but not limited to, server logs or other types of event data and/or records. In at least one of various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second. In some embodiments, the machine data may be unstructured data, structured data, and/or a combination thereof. Unstructured data may refer to data that does not include at least one predefined field.

As used herein, the term "attribute" may refer to a property and/or characteristic of data in a table. In some embodiments, the data of each column of a table may include one or more separate attributes.

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards determining and tracking metadata for the generation of visualizations of requested data. In at least one embodiment, a user may request data by providing a query to search for the requested data. In some embodiments, the query may include a plurality of commands to perform the search. In at least one of various embodiments, the plurality of commands may be employed in a pipeline to generate a table of the requested data. In some embodiments, each command may be executed to perform an action on a set of data, such as an initially retrieved dataset and/or a result from the execution of a previous command. In at least one embodiment, the execution of a command may generate one or more columns to append and/or insert into the table of requested data. Metadata for each generated column may be determined based on the action of at least one of the plurality of commands. In at least one embodiment, the table of requested data and the column metadata may be employed to generate and display a visualization of at least a portion of the requested data to a user.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include metadata tracking server device (MTSD) 112, data visualization server device (DVSD) 114, enclosure of blade servers 110, enclosure of server computers 116, super computer network device 118, and the like. Although not shown, one or more client devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (Wi-Max), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, and the like.

One embodiment of MTSD 112 is described in more detail below in conjunction with FIG. 4. Briefly, however, MTSD 112 includes virtually any network device capable of generating and/or managing metadata for columns for a table of requested data. In some embodiments, MTSD 112 may be configured to search for the requested data based on a provided query. In at least one embodiment, the query may include a plurality of commands. MTSD 112 may execute the commands in a pipeline to generate one or more columns of the table of requested data. In some embodiments, MTSD 112 may automatically generate metadata for each generated column based on actions performed by executing a corresponding command. Devices that may be arranged to operate as MTSD 112 include various network devices, including, but not limited to personal computers, desktop computers, multiprocessor systems, microprocessor-based or programmable consumer electronics, network PCs, server devices, network appliances, and the like.

Although FIG. 1 illustrates MTSD 112 as a single computing device, the invention is not so limited. For example, one or more functions of the MTSD 112 may be distributed across one or more distinct network devices. Moreover, MTSD 112 is not limited to a particular configuration. Thus, in one embodiment, MTSD 112 may contain a plurality of network devices. In another embodiment, MTSD 112 may contain a plurality of network devices that operate using a master/slave approach, where one of the plurality of network devices of MTSD 112 operates to manage and/or otherwise coordinate operations of the other network devices. In other embodiments, the MTSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of DVSD 114 is described in more detail below in conjunction with FIG. 4. Briefly, however, DVSD 114 includes virtually any network device capable of generating a visualization of a table of requested data based on column metadata. In some embodiments, DVSD 114 may be in communication with MTSD 112 to utilize tracked metadata for visualization. In at least one embodiment, DVSD 114 may be configured to enable a user to select one or more attributes of the requested data to display data that is associated with those attributes (e.g., by employing the tracked metadata to determine which columns are associated with the attributes). Devices that may be arranged to operate as DVSD 114 include various network devices, including, but not limited to personal computers, desktop computers, multiprocessor systems, microprocessor-based or programmable consumer electronics, network PCs, server devices, network appliances, and the like.

Although FIG. 1 illustrates DVSD 114 as a single computing device, the invention is not so limited. For example, one or more functions of the DVSD 114 may be distributed across one or more distinct network devices. Moreover, DVSD 114 is not limited to a particular configuration. Thus, in one embodiment, DVSD 114 may contain a plurality of network devices. In another embodiment, DVSD 114 may contain a plurality of network devices that operate using a master/slave approach, where one of the plurality of network devices of DVSD 114 operates to manage and/or otherwise coordinate operations of the other network devices. In other embodiments, the DVSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Enclosure of Blade Servers

Figure 2A:
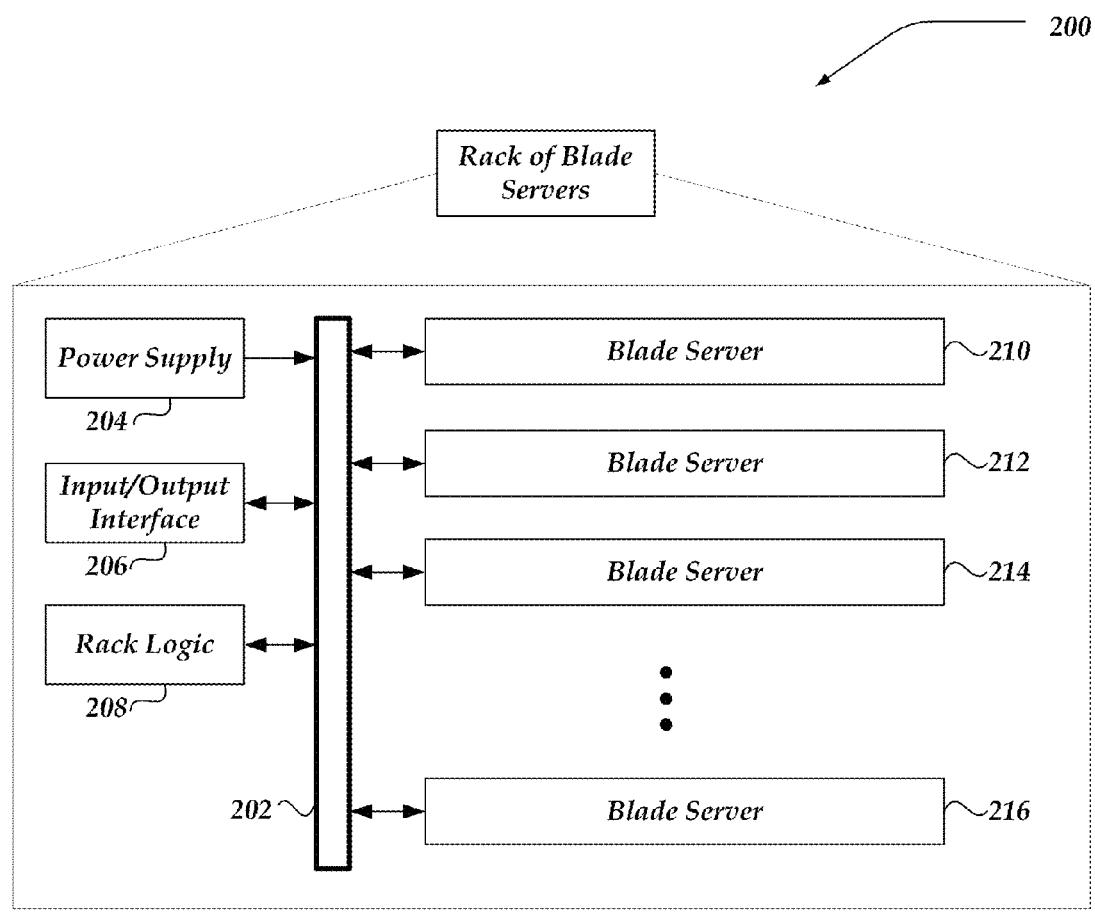
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
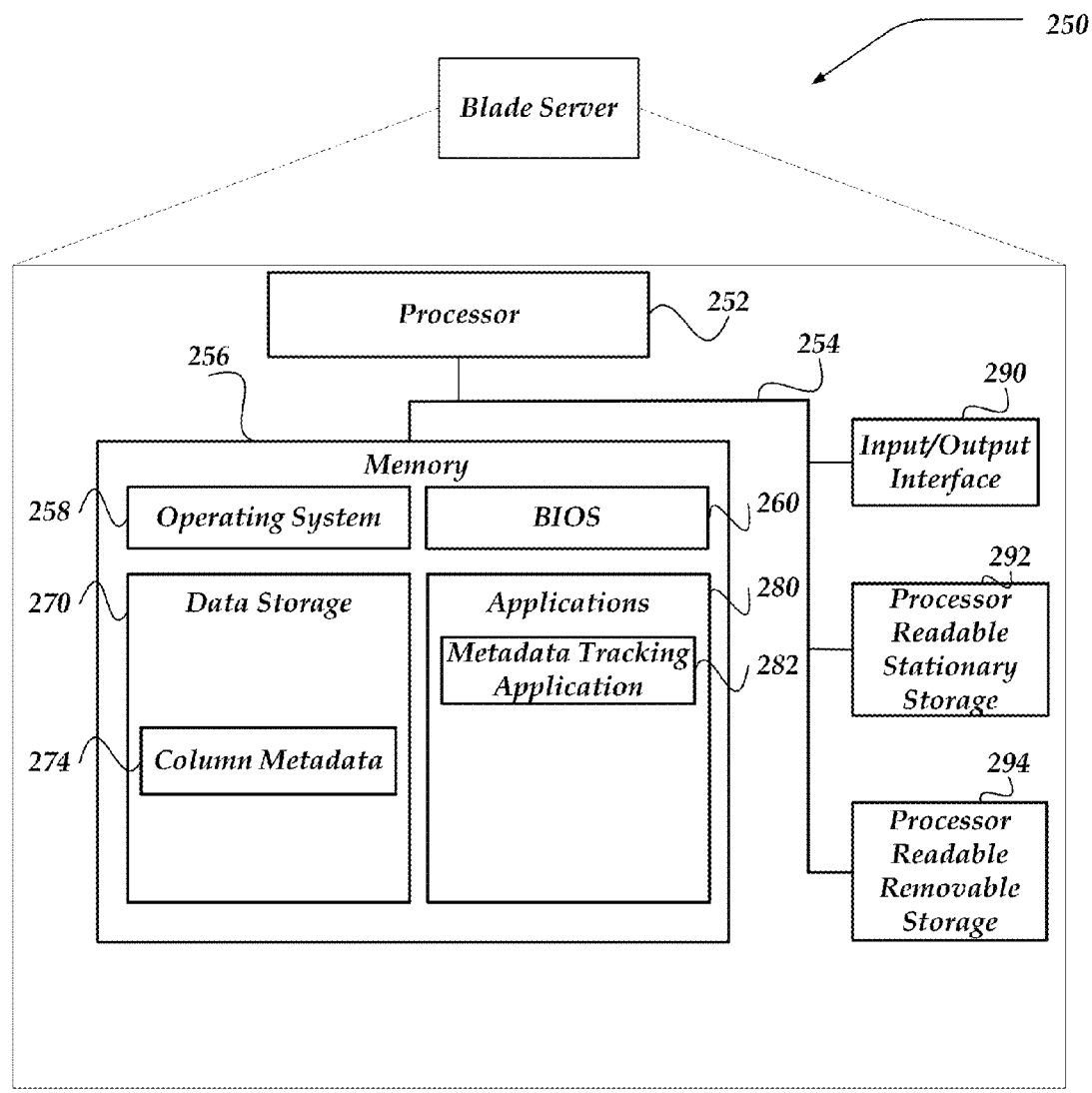
FIG. 2B illustrates an embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 may include processor 252 which communicates with memory 256 via bus 254. Blade server 250 may also include input/output interface 290, processor-readable stationary storage device 292, and processor-readable removable storage device 294. Input/output interface 290 can enable blade server 250 to communicate with other blade servers, client devices, network devices, and the like. Interface 290 may provide wireless and/or wired communication links for blade server. Processor-readable stationary storage device 292 may include devices such as an electro-magnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUX™, or a specialized server operating system such as Microsoft's Windows Server™ and Apple Computer's iOS Server™.

Memory 256 may further include one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, column metadata 274. In at least one embodiment, column metadata 274 may include a plurality of metadata for one or more columns of a table of requested data. In some embodiments, column metadata 274 may include an identifier, pointer, or other reference for each metadata to a corresponding column.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, metadata tracking application 282. In some embodiments, metadata tracking application 282 may be configured to determine and track column metadata for a table of requested data based on a plurality of commands in a query for the requested data.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
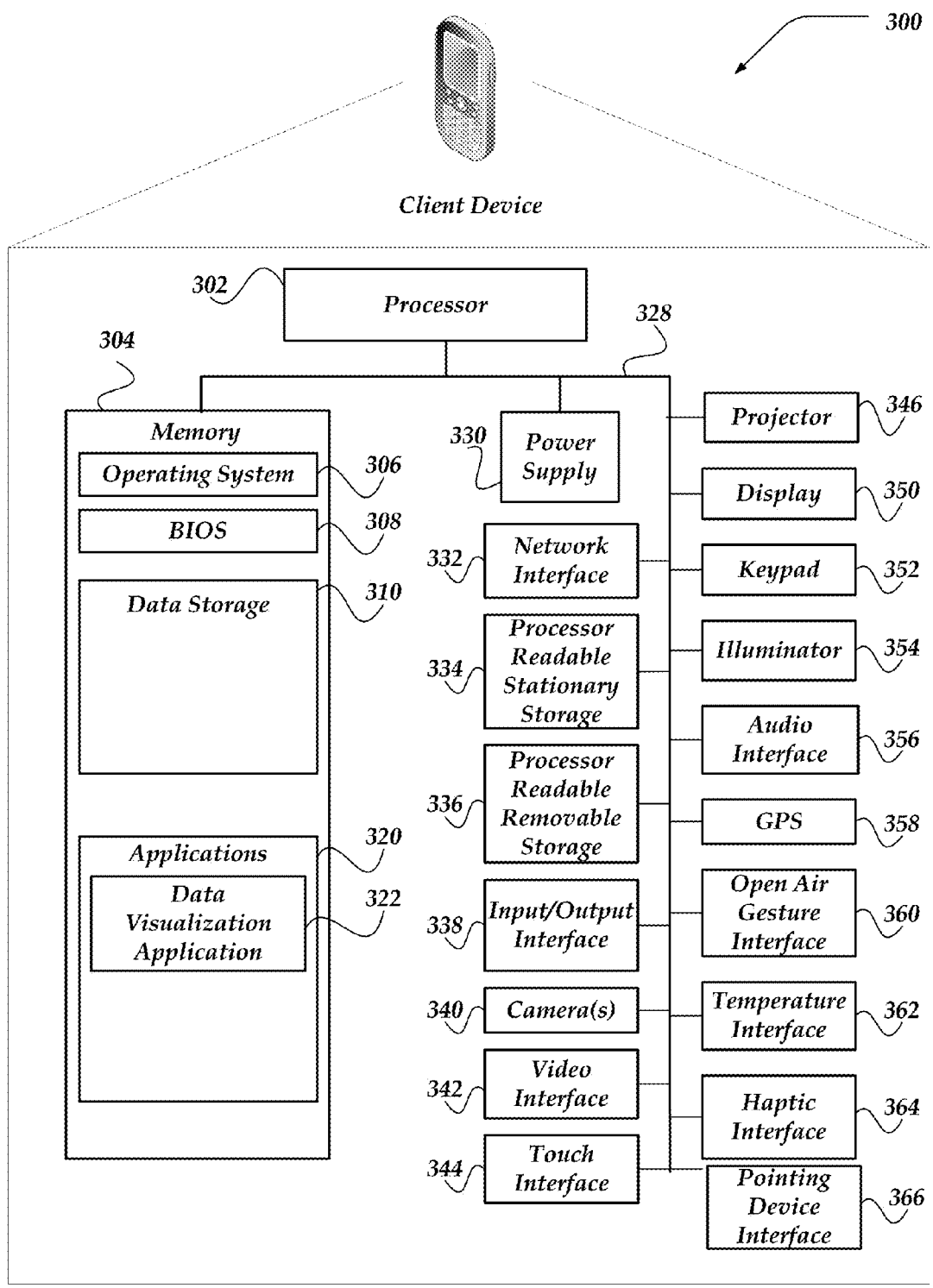
FIG. 3 shows a client device that may be included in various embodiments.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by client device 300, transmit, receive, and/or otherwise process instructions and data. Applications 320 may include, for example, data visualization application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Data visualization application 322 may be configured to enable the generation of a visualization of a table of requested data based on column metadata. In at least one embodiment, data visualization application 322 may interact with and/or employed through a web browser. In some embodiments, embodiments, data visualization application 322 may enable a user to select one or more attributes of the requested data to display data that is associated with those attributes (e.g., by employing the tracked metadata to determine which columns are associated with the attributes). In other embodiments, data visualization application 322 may display one or more graphical representations of at least a portion of the requested data based on the selected attributes.

Figure 5:
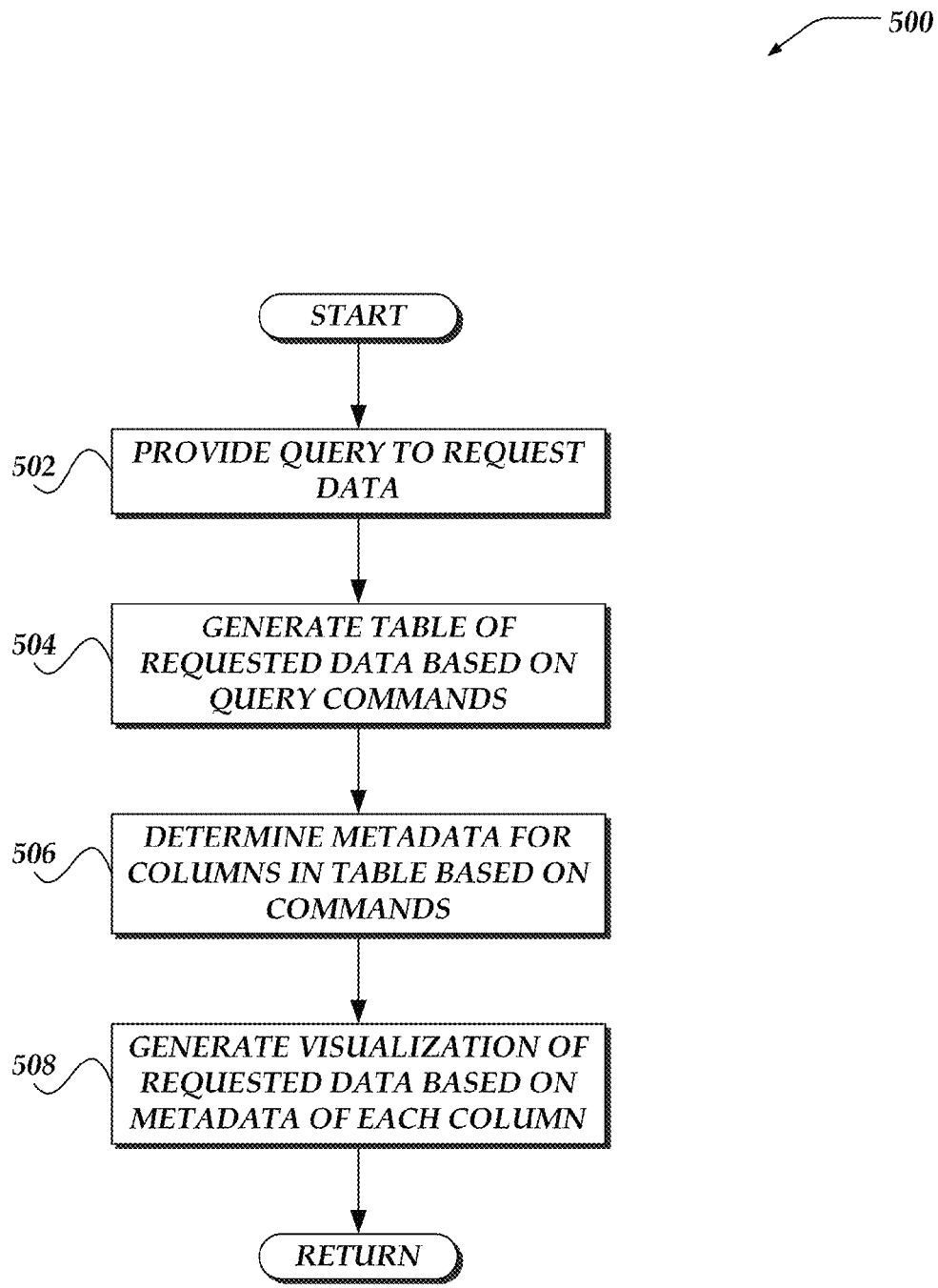
FIG. 5 illustrates a logical flow diagram generally showing one embodiment of an overview process for generating a visualization of at least a portion of a data table based on metadata associated with the table.
Figure 6:
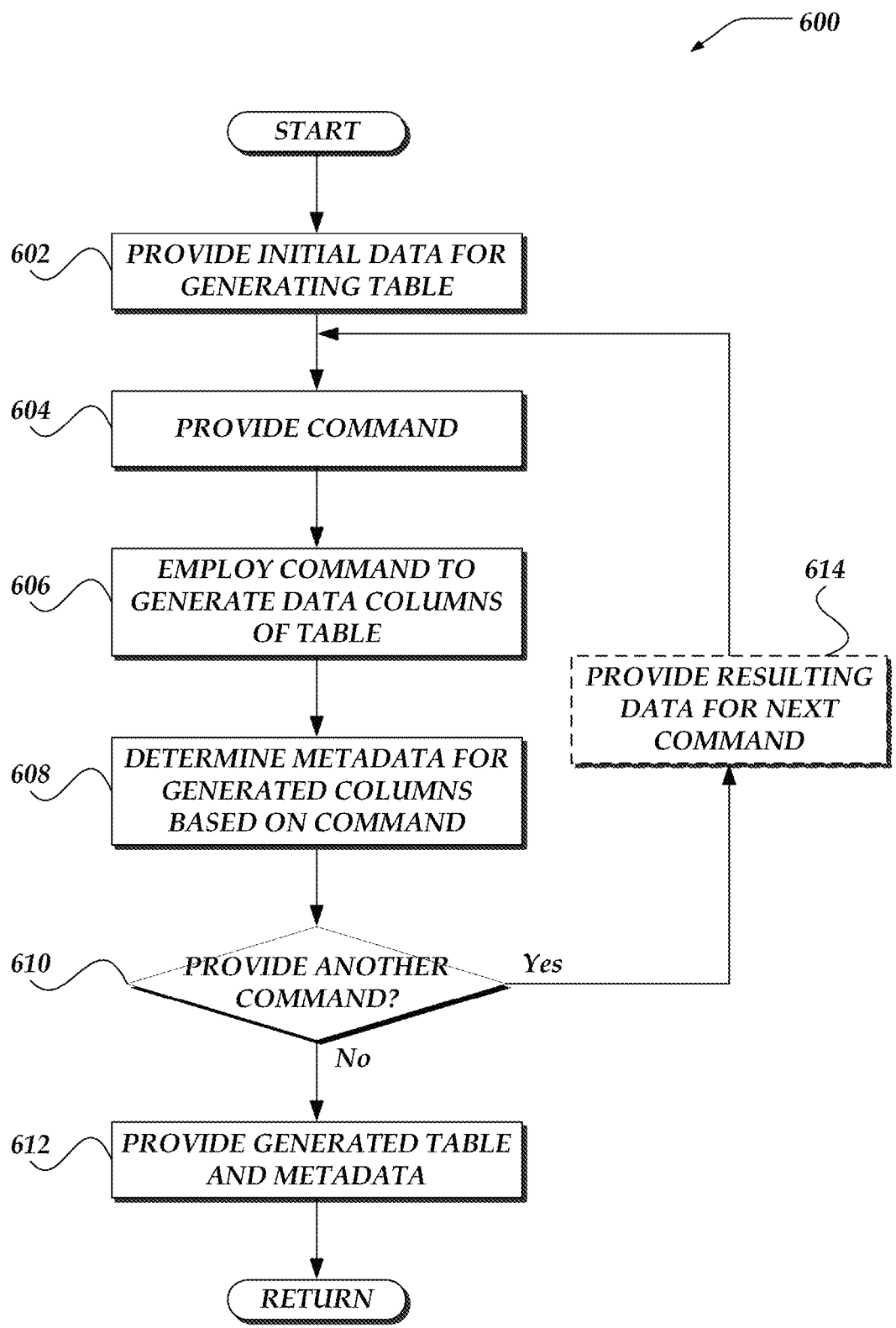
FIG. 6 illustrates a logical flow diagram generally showing one embodiment of a process for employing a pipeline of commands to generate a data table and track metadata for at least one column of the table.
Figure 7:
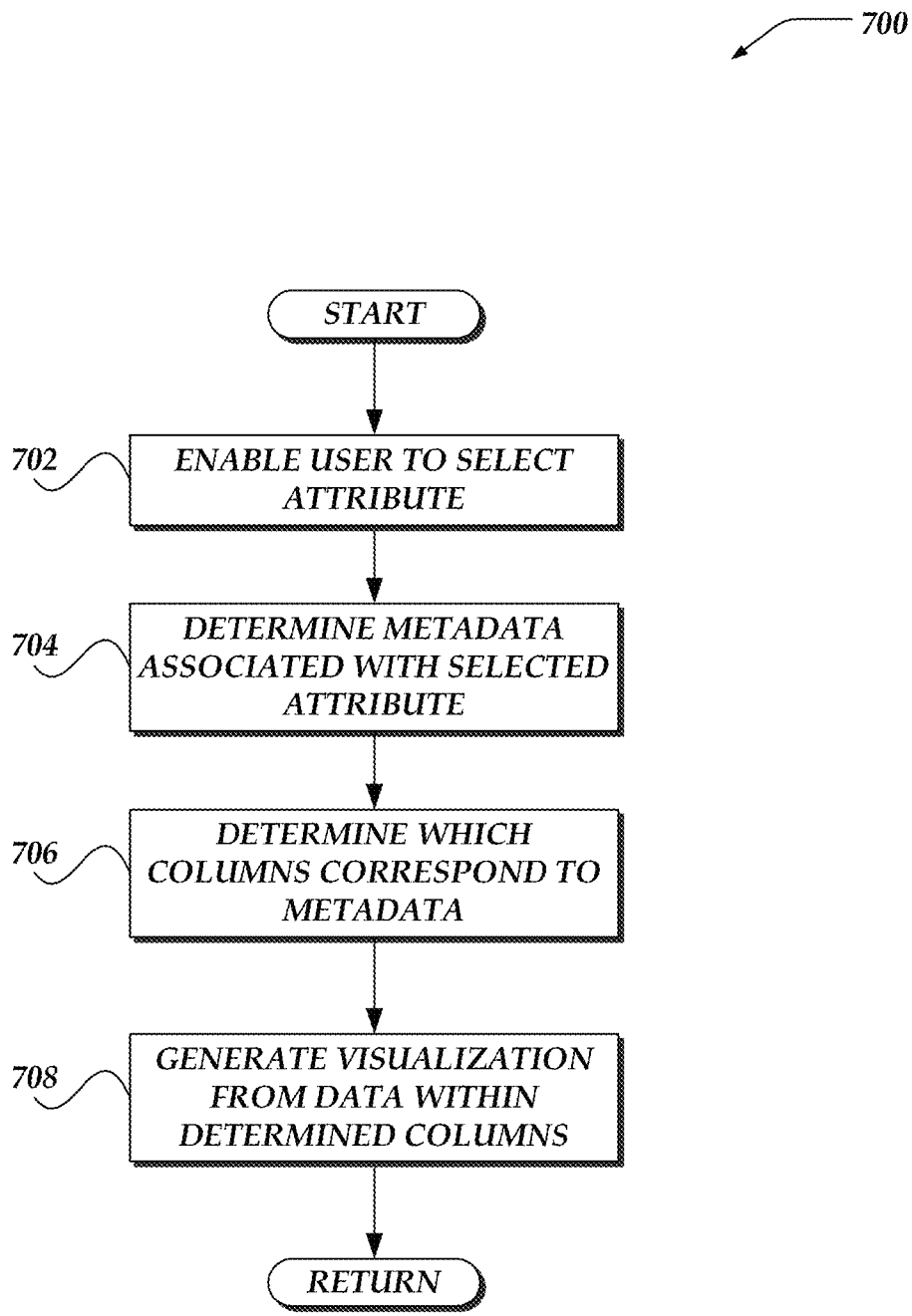
FIG. 7 illustrates a logical flow diagram generally showing one embodiment of a process for employing column metadata to generate a visualization of data in a table.

In any event, data visualization application 322 may employ processes, or parts of processes, similar to those described in conjunction with FIGS. 5-7, to perform at least some of its actions.

Illustrative Network Device

Figure 4:
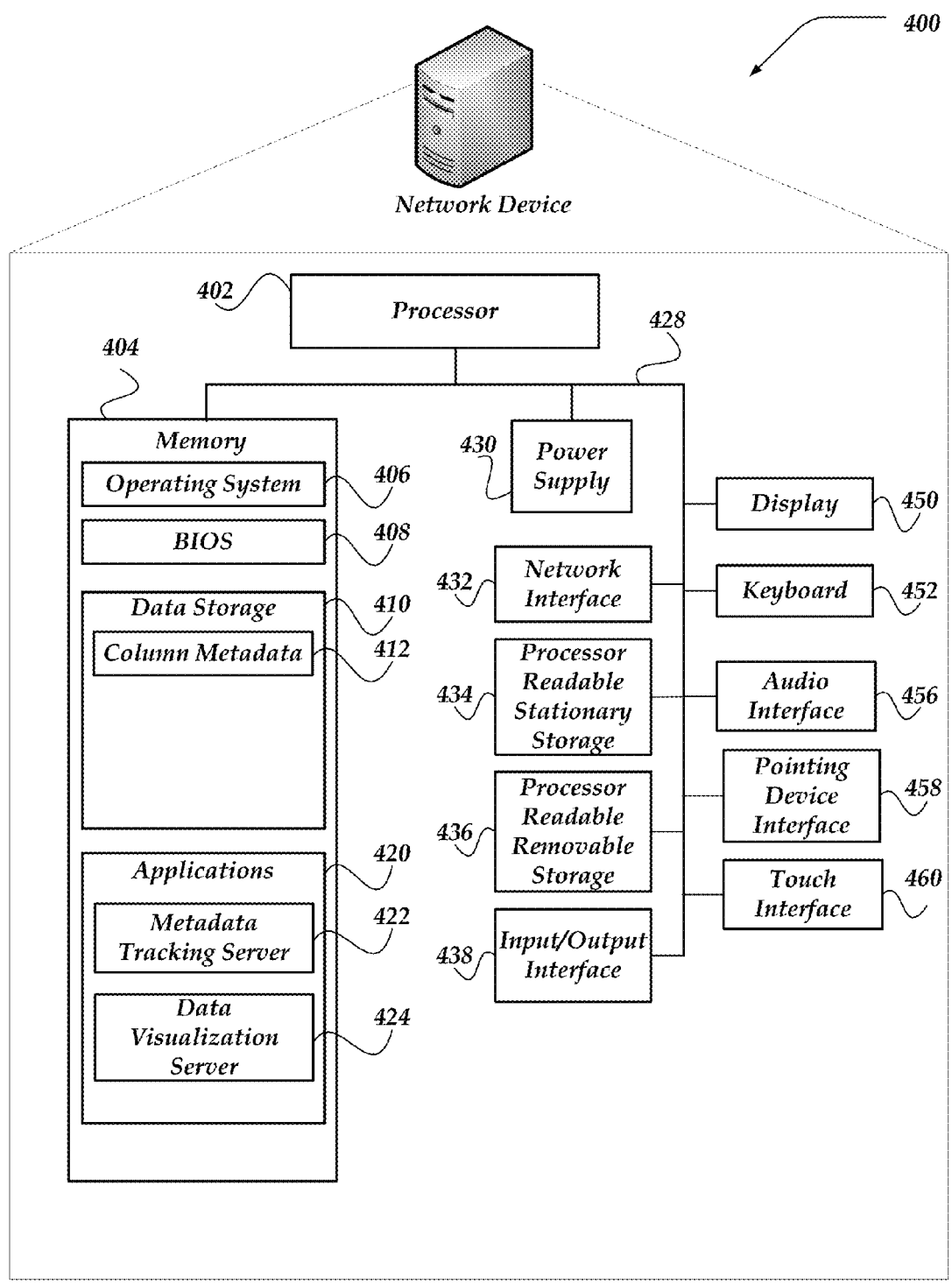
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 may include a processor 402 in communication with a memory 404 via a bus 428. Network device 400 may also include a power supply 430, network interface 432, audio interface 456, display 450, keyboard 452, input/output interface 438, processor-readable stationary storage device 434, processor-readable removable storage device 436, and pointing device interface 458. Power supply 430 provides power to network device 400.

Network interface 432 may include circuitry for coupling network device 400 to one or more networks, and is constructed for use with one or more communication protocols and technologies including, but not limited to, protocols and technologies that implement any portion of the Open Systems Interconnection model (OSI model), GSM, CDMA, time division multiple access (TDMA), UDP, TCP/IP, SMS, MMS, GPRS, WAP, UWB, WiMax, SIP/RTP, or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™ WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components can include any component that allows the computer to take input from, or send output to, a human user of a computer.

Memory 404 may include RAM, ROM, and/or other types of memory. Memory 404 illustrates an example of computer-readable storage media (devices) for storage of information such as computer-readable instructions, data structures, program modules or other data. Memory 404 may store BIOS 408 for controlling low-level operation of network device 400. The memory may also store operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400.

Data storage 410 may include, for example, column metadata 412. In some embodiments, column metadata 412 may include a plurality of metadata for one or more columns of a table of requested data. In some embodiments, column metadata 412 may include an identifier, pointer, or other reference for each metadata to a corresponding column. In at least one embodiment, column metadata 412 may be stored and/or otherwise processed by MTSD 112 of FIG. 1.

Applications 420 may include computer executable instructions which, when executed by network device 400, transmit, receive, and/or otherwise process messages (e.g., SMS, MMS, Instant Message (IM), email, and/or other messages), audio, video, and enable telecommunication with another user of another client device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, metadata tracking server 422.

Metadata tracking server 422 may be configured determine and track column metadata for a table of requested data based on a plurality of commands in a query for the requested data. Metadata tracking server 422 may be configured to generate and/or manage metadata for columns for a table of requested data. In some embodiments, metadata tracking server 422 may be configured to search for the requested data based on a provided query. In at least one embodiment, the query may include a plurality of commands. Metadata tracking server 422 may execute the commands in a pipeline to generate one or more columns of the table of requested data. In some embodiments, metadata tracking server 422 may automatically generate metadata for each generated column based on actions performed by executing a corresponding command. In some embodiments, metadata tracking server 422 may be employed by MTSD 112 of FIG. 1. In any event, metadata tracking server 422 may employ processes, or parts of processes, similar to those described in conjunction with FIGS. 5-7, to perform at least some of its actions.

Data visualization server 424 may be configured to generate a visualization of a table of requested data based on column metadata. In at least one embodiment, data visualization server 424 may be configured to enable a user to select one or more attributes of the requested data to display data that is associated with those attributes (e.g., by employing the tracked metadata to determine which columns are associated with the attributes). In some embodiments, Metadata data visualization server 424 may be employed by DVSD 114 of FIG. 1. In any event, data visualization server 424 may employ processes, or parts of processes, similar to those described in conjunction with FIGS. 5-7, to perform at least some of its actions.

General Operation

The operation of certain aspects of the invention will now be described with respect to FIGS. 5-7. FIG. 5 illustrates a logical flow diagram generally showing one embodiment of an overview process for generating a visualization of at least a portion of a data table based on metadata associated with the table. In some embodiments, process 500 of FIG. 5 may be implemented by and/or executed on a single network device, such as network device 400 of FIG. 4. In other embodiments, process 500 or portions of process 500 of FIG. 5 may be implemented by and/or executed on a plurality of network devices, such as network device 400 of FIG. 4. In yet other embodiments, process 500 or portions of process 500 of FIG. 5 may be implemented by and/or executed on one or more blade servers, such as blade server 250 of FIG. 2B. However, embodiments are not so limited and various combinations of network devices, blade servers, or the like may be utilized.

Process 500 begins, after a start block, at block 502, where a query to search for requested data may be provided. In at least one embodiment, a user may input the query through a graphical user interface. In another embodiment, the query may be automatically generated based on a request from the user, a predetermined request, or the like.

In some embodiments, the query may include one or more commands to search for and/or obtain the requested data. In at least one embodiment, the plurality of commands may enable retrieval of at least a portion of the requested data. For example, a command may be provided to retrieve an initial dataset from a database, another command may filter the retrieved data, yet another command may perform some statistical action on the retrieved and/or filtered data, or the like. Embodiments are not limited to these example commands; but rather, other commands may be employed for defining a query to search for requested data.

In some embodiments, the commands of a query may be executed as functions that perform actions on data provided to the function. In some embodiments, the commands may construct a field. Examples of such field construction commands may include, but is not limited to, evaluate( ), lookup( ), string_concatenate( ), or the like. In other embodiments, the commands may perform some calculation and/or statistical operation. Examples of such statistical commands may include, but is not limited to, average( ), count( ), minimum( ), maximum( ), distinct_count( ), earliest( ), latest( ), or the like.

An example of a query may be "chart average (a) by b," where 'b' may be an indicator of how the data is arranged (e.g., rows of a table) and 'a' may be the data from which to calculate the average for each 'b'. Utilizing this example, a command may be "chart average (number of sales) by sales person", which may generate a table that includes a row for each sales person and a column of the average number of sales for each corresponding sales person.

In some other embodiments, a query may be a function that when executed includes a plurality of commands. One non-limiting, non-exhaustive example may be "chart average (a) by b and c", where 'b' may be an indicator of how the data is arranged (e.g., rows of a table), 'a' may be the data from which to calculate the average for each 'b', and 'c' may be another indicator of how the data is arranged (e.g., how the result of 'a' may be split into multiple columns). For example, the query "chart average (number of sales) by sales person by region" may include separate commands to calculate the average sales of each sales person for each separate region. In this example, a resulting table may include a row for each sales person and a separate column of the average number of sales for each corresponding sales person for a given region.

As described in more detail below, the commands may be performed in a pipeline. A non-limiting, non-exhaustive, example of a pipeline query may be shown by the code fragment illustrated in FIG. 10.

Process 500 proceeds next to block 504, where a table of the requested data may be generated based on the query commands. In at least one of various embodiments, the commands may be employed as a pipeline to generate the table of requested data. Each command may generate one or more columns of the table based on the action performed by the command. In at least one embodiment, separate and/or different commands may execute on initially retrieved data and may generate additional columns to add to the table. In another embodiment, the result of a command may be provided to the next command, such that the columns generated by the next command may be dependent on the result of a previous command.

One non-limiting, non-exhaustive example, of pipeline commands may be a first command may retrieve total sales data for a plurality of sales persons; a second command may separate the total sales into sales per region; and a third command may calculate an average number of sales per region for each sales person. In this example, executing the first command may generate two columns, a column that lists the sales persons and a second column that lists the total sales for each person; executing the second command may generate an additional column for each region that includes the total sales for each region; and executing the third command may generate another column for each region for the percentages.

The generated columns may be appended to the end and/or to the right side of the table, inserted between previously generated columns of the table, or the like. In at least one embodiment, insertion of a column may be referred to as a "split" column. Using the example above, each region column may be split into two columns, one for the sales of that region and one for the percentage of sales for that region.

In any event, process 500 continues at block 506, where separate metadata for each of the at least one generated column may be determined. An example process for generating the table of requested data (block 504) and determining the metadata of each column (block 506) is described in more detail below in conjunction with FIG. 6.

In at least one of various embodiments, metadata may be determined for each column that is generated for the table. The metadata of a column may be determined based on the command that is executed to generate that column. In at least one such embodiment, separate metadata for each of the columns of the table may be determined based on each corresponding action enabled by the command. For example, if the command performs an add operation on integer values, the metadata for a total column would also be an integer. Although embodiments are primarily described as generating columns and determining metadata for those columns, embodiments are not so limited. But rather, similar embodiments may be employed for rows of a table or other arrangements of data.

In at least one embodiment, the metadata for a column may include at least one attribute of the data within the column. The metadata may describe at least one attribute of at least its corresponding column. In at least one of various embodiments, the metadata may be based on a user defined attribute of the retrieved data. These attributes can be spit into three main categories: data type, column type, and column group type—although other categories may be employed.

Data type may refer to the type of data within the column, such as, for example, a number, a string, a time, or the like. In some embodiments, the data types may be, but not limited to, quantitative, ordered, categorical, or the like. Quantitative may include number, time, year, latitude, longitude, or the like; ordered may include days of the week, months of the year, quarters of the year, quarters of a financial year, or the like; and categorical may include string, city, state or providence, country, zip code, or the like. The above examples are not to be construed as limiting, but rather other attributes may be employed as a data type of data within a column. In some other embodiments, the data type may also be predefined in a hierarchy. For example, a data type may be both quantitative and latitude, where latitude may be a sub-type of quantitative.

In some embodiments, the data type may be automatically determined based on a command as the table is being generated. For example, the command average may generate a first column and a second column, where the first column may include a list of each sales person (e.g., x-axis if the table is transformed into a graphical chart) and the second column may include the average number of sales for each sales person. In this example, the first column may be automatically associated with a data type of string and the second column may be automatically associated with a data type of number. In other embodiments, data in the table may be analyzed after it is generated to determine the data types. In yet other embodiments, the data type may be manually set by a user. However, embodiments are not so limited and other methods for determining the data type may be employed.

Column type may refer the type of column for determining how to treat the data within a column. Examples of different column types may include, but are not limited to, value, split (x-axis, axis, headings, categorized, dimensions, or the like), split containing other (e.g., too many attributes to split into columns), split containing null, total, or the like. Value may indicate that the data within the column can be utilized as data points for generating a visualization (e.g., points on a graph). Split may indicate that the data within the column is a label associated with data in a value column. For example, a first column may be a split column and may include a list of each sales person, and a second column may be a value column and may include a number of sales for each sales person. Split containing other may include a plurality of labels that may not be split into different columns. Split containing null may be a column generated from the execution of a command that results in an empty column, i.e., no data in the column. Total may refer to a value column that is a combination of values from other value columns, including subtotals, complete totals, or the like. The above examples are not to be construed as limiting, but rather other column types may be employed.

In some embodiments, the column type may be automatically determined based on a command as the table is being generated. For example, if execution of a command results in a first column with a list of each sales person and a second column of the sales for each sales person, then the column type for the first column may be automatically determined as a split and the column type for the second column may be automatically determined to be a value. In other embodiments, the column type may be manually set by a user. However, embodiments are not so limited and other methods for determining the column type may be employed.

Column group type may refer to multiple columns that share some property. For example, each column that includes a total number of sales for a given quarter may be grouped together and may have a column group "total sales." In some embodiments, columns with a same column group may not be side by side in the table, but rather may be spread throughout the table. These examples are not to be construed as limiting, but rather other column groups may be employed.

In some embodiments, the column type may be automatically determined based on a command as the table is being generated. In other embodiments, the column type may be manually set by a user. In yet other embodiments, the column type may be automatically determined based on an analysis of the table after it is generated. For example, a user may change a heading of multiple columns. A column group may then be determined for these columns based on the headings provided by the user. However, embodiments are not so limited and other methods for determining the column groups may be employed.

In at least one embodiment, a user may be enabled to change features of a column, such as a heading, font color, font style, or the like. But in some embodiments, the user may be prohibited from changing the metadata or at least portions of the metadata. For example, the user may be enabled to change the data type of a column from number to zip code, but may be prohibited from changing the column type of the column.

Figure 8A:
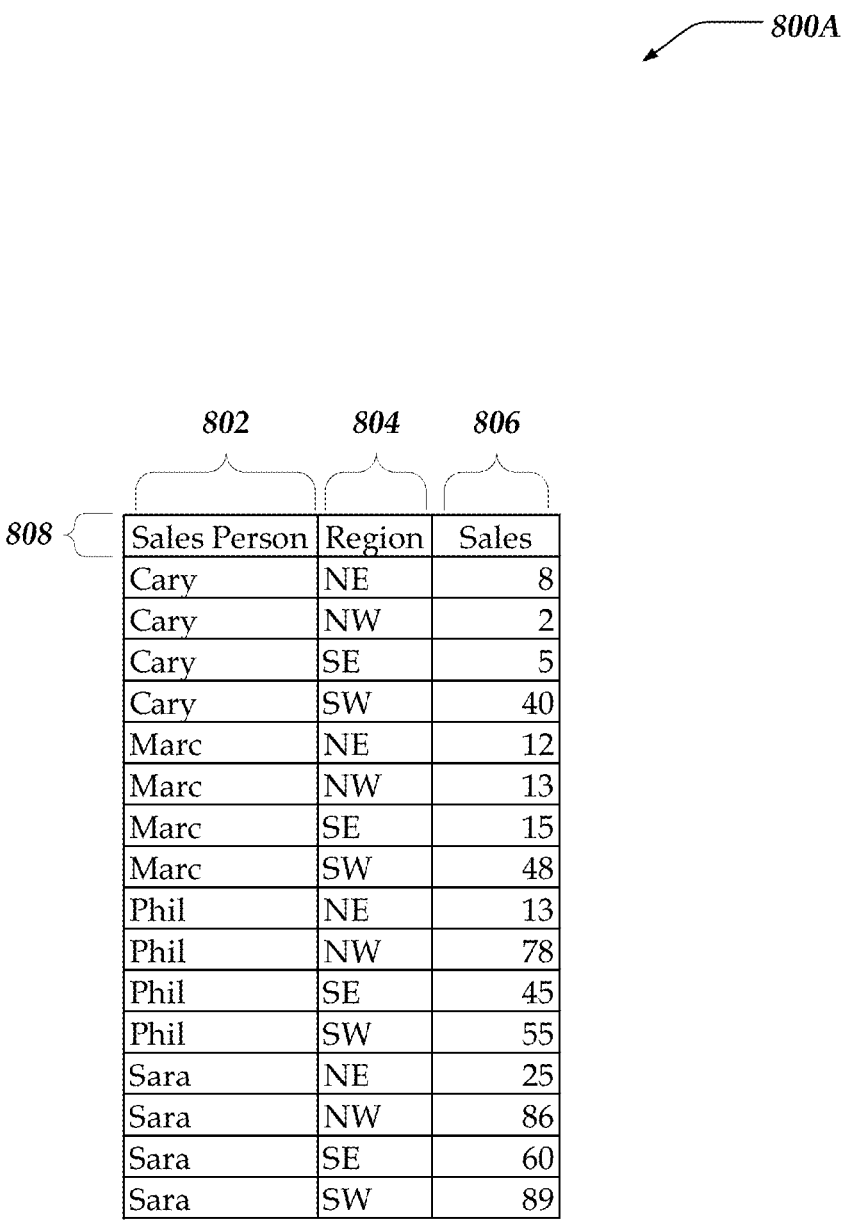

Examples of tables and their corresponding metadata are illustrated in FIGS. 8A-8B.

In some embodiments, the metadata of each column may be maintained within a corresponding column in the table (for example a first set of rows of each column may include the metadata of the corresponding column). In other embodiments, the metadata may be maintained separate from the table, such that an identifier, pointer, or other reference is maintained to track the corresponding metadata of each column. It should be recognized that a user may be enabled to move columns within the table such that the metadata of the moved columns is maintained.

In any event, process 500 proceeds to block 508, where a visualization of the requested data may be generated and displayed based on the metadata of each column, which is described in more detail below in conjunction with FIG. 7. Briefly, however, a user may be enabled to select at least one attribute of the requested data and a table, graph, or other visualization may be generated based on columns with metadata that correspond to the selected attributes.

In some embodiments, the metadata may be employed to determine whether the generated table is compatible with a certain type of visualization (e.g., can the table be rendered in a display as a scatter plot?). In at least one embodiment, a list of compatible visualizations—determined based on the metadata—may be displayed to the user as available visualizations. The user may be enabled to select an available visualization to generate and display the visualization based on the table and the metadata of at least one column of the table.

After block 508, process 500 may return to a calling process to perform other actions.

FIG. 6 illustrates a logical flow diagram generally showing one embodiment of a process for employing a pipeline of commands to generate a data table and track metadata for at least one column of the table. In some embodiments, process 600 of FIG. 6 may be implemented by and/or executed on a single network device, such as network device 400 of FIG. 4. In other embodiments, process 600 or portions of process 600 of FIG. 6 may be implemented by and/or executed on a plurality of network devices, such as network device 400 of FIG. 4. In yet other embodiments, process 600 or portions of process 600 of FIG. 6 may be implemented by and/or executed on one or more blade servers, such as blade server 250 of FIG. 2B. However, embodiments are not so limited and various combinations of network devices, blade servers, or the like may be utilized.

Process 600 begins, after a start block, at block 602, where an initial dataset for generating a table of requested data may be provided. In some embodiments, the initial dataset may be retrieved and/or obtained from a database. In at least one of various embodiments, the initial dataset may be retrieved by employing a first command of a query, such as may be provided at block 502 of FIG. 5.

Process 600 proceeds to block 604, where a command may be provided. In at least one embodiment, the command may be a command in a query, such as may be provided at block 502 of FIG. 5. In some embodiments, if the query includes a plurality of commands, the command may be a next command in a pipeline process.

Process 600 continues at block 606, where the command may be executed to generate at least one column of data for the table. In some embodiments, pipeline execution of the plurality of commands may be provided to generate a table of the retrieved data. In at least one embodiment, employment of the command may include executing the command to perform an action on the provided and/or retrieved data. In some embodiments, the provided data may be the initial dataset. In other embodiments, the provided data may be a result data from the execution of another command (e.g., a previous command in the pipeline), such as columns of the table that were previously generated. In at least one such embodiment, a result of a first command may be provided to a second command, wherein execution of the second command is based on the provided result.

In at least one embodiment, block 606 may employ embodiments of block 504 of FIG. 5 to generate at least one column. In some embodiments, generating a data column may include inserting a column into the table, appending a column to the table, or the like.

Process 600 proceeds next to block 608, where metadata for the generated columns may be determined based on the provided command. In at least one of various embodiments, block 608 may employ embodiments of block 506 of FIG. 5 to determine the metadata for at least one column of the table. In some embodiments, at least a portion of the metadata may be determined by post processing the generated table and/or provided by a user.

In some embodiments, the metadata may include information about how different columns relate to one another. For example, assume the table includes four columns, the first includes a list of sales people, and the other three include the total sales per region for each sales person. Another command may generate at block 606 three additional columns that may include the percent number of sales for that sales person for each region. In this example, the metadata of each of the three additional columns may include information that indicates that it is a split of a previous region column. An example of this split may be illustrated in FIGS. 9A and 9B.

In any event, process 600 continues at decision block 610, where a determination may be made whether anther command is provided. In at least one embodiment, another command may be provided if there is a next command in the query, such that each command of a query may be provided. In at least one such embodiment, the commands may be provided in a predetermined order (e.g., as input by a user, automatically determined based on the requested data, or the like). In various embodiments, the commands may be provided one at a time. However, embodiments are not so limited and other methods for determining if another command is provided may be employed. If another command may be provided, then process 600 may flow to block 614; otherwise, process 600 may flow to block 612.

At block 614, the resulting data may be provided to a next command. In some embodiments, the resulting data may be a table that is the result of processing blocks 606 and 608 for a previous command, such that execution of the next command may be based on and/or utilize the resulting data. In other embodiments, block 614 may be optional, such that a next provided command may be employed on the initial dataset, rather than (or in addition to) the resulting data. After block 614, process 600 may flow to block 604 to provide the next command.

If another command is not provided at decision block 610, then process 600 may flow from decision block 610 to block 612. At block 612, the generated table and column metadata may be provided. In some embodiments, the table may be displayed to a user. In other embodiments, the table may be provided for other processing, such as, but not limited to, determining other metadata regarding the columns in the table, generating a visualization of at least a portion of the data in the table (e.g., a described in more detail below in conjunction with FIG. 7), or the like.

After block 612, process 600 may return to a calling process to perform other actions.

FIG. 7 illustrates a logical flow diagram generally showing one embodiment of a process for employing column metadata to generate a visualization of data in a table. In some embodiments, process 700 of FIG. 7 may be implemented by and/or executed on a single network device, such as network device 400 of FIG. 4. In other embodiments, process 700 or portions of process 700 of FIG. 7 may be implemented by and/or executed on a plurality of network devices, such as network device 400 of FIG. 4. In yet other embodiments, process 700 or portions of process 700 of FIG. 7 may be implemented by and/or executed on one or more blade servers, such as blade server 250 of FIG. 2B. However, embodiments are not so limited and various combinations of network devices, blade servers, or the like may be utilized.

Process 700 begins, after a start block, at block 702, where a user may be enabled to select an attribute of data within a table. In some embodiments, the user may select a plurality of attributes. For example, a user may select a column type attribute (e.g., value), a data type attribute (e.g., number), and another column type attribute (e.g., split for x-axis labels). In some embodiments, a graphical user interface may be employed to enable a user to select attributes. In some embodiments, the user may click on and/or otherwise select one or more columns to utilize for the generation of a visualization. In some other embodiments, the user may select which attributes to not include in the visualization, such as a "total" column. In yet other embodiments, the attributes may be selected based on the query or a request that generated the query.

Process 700 proceeds to block 704, where metadata associated with the selected attribute may be determined. In at least one embodiment, the metadata of each column may be searched and/or analyzed to determine if the metadata includes at least one of the selected attributes. For example, if a user selected a percentage, then the metadata with the percentage attribute may be determined.

Process 700 continues at block 706, where the columns that correspond to the determined metadata may be determined. In at least one embodiment, the determined metadata may include an identifier, pointer, or other reference to the corresponding columns.

Process 700 proceeds next to block 708, where a visualization may be generated from data within the determined columns. In at least one embodiment, the visualization may include displaying a graphical representation of the data to the user, such that other data in the table (i.e., data within columns that do not include the selected attribute) may not be displayed. In some embodiments, a type of visualization may be selected. For example, a user may be enabled to select the visualization as a bar graph, stacked bar graph, pie graph, line chart, heatmap, scatter plot, or the like. In at least one embodiment, the generated visualization may be displayed to the user.

After block 708, process 700 may return to a calling process to perform other actions. In some embodiments, process 700 may loop (not shown) to block 702 to enable the user to select other attributes for the generation of another visualization.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustration

FIGS. 8A-8B illustrate non-exhaustive examples of use case embodiments of tables with column metadata generated based on a query for requested data.

FIG. 8A illustrates a non-exhaustive example of a use case of an embodiment of a table generated from user query for total sales of each sales person per region. Table 800A may include columns 802, 804, and 806. Table 800A may also include column headings 808. Columns headings 808 may include label for one or more columns. In some embodiments, the labels may be obtained and/or determined from the requested data. In at least one embodiment, a user may be enabled change one or more of the labels in column headings 808. In some embodiments, table 800A may not include a separate row for column headings 808.

Column 802 may include a list of each sales person. In this example, there are multiple rows for each sales person, where each row for each sales person is for a different region. Column 804 may list the regions for each sales person. Column 806 may list the total sales for each sales person for each region.

Employing embodiments described above, separate metadata may be determined and/or tracked/maintained for each column, where the metadata of each column may indicate one or more attributes of the corresponding column. For example, column 802 may include a column type attribute of "split" (to indicate that other columns relate to column 802) and data type attribute of "string" (to indicate that the data in each cell is a string). Column 804 may include a column type attribute of "split-category" (to indicate that data from column 802 is split into categories, such as regions) and data type attribute of "string" (to indicate that the data in each cell is a string). Column 806 may include a column type attribute of "value" (to indicate that the data can be plot in a visualization), a data type attribute of "integer" (to indicate that the data in each cell is an integer). The metadata of these columns is merely an example and other metadata may be employed.

FIG. 8B illustrates a non-exhaustive example of a use case of an alternative embodiment of a table generated from user query for total sales of each sales person per region. Similar to table 800A of FIG. 8A, Table 800B may include columns 802, 804, and 822. Columns 802 and 804 may be embodiments of columns 802 and 804, respectively, of FIG. 8A. Column 822 may be similar to column 806 of FIG. 8A, but column 822 may include additional metadata to indicate that it includes total values.

Table 800A may also include columns 810, 812, 814, 816, and 818. In this example, each of these columns may include a number of sales for each day of the week. These columns may include the following metadata: a column type attribute of "value," a data type attribute of "integer," and a column group attribute of "days of the week."

Figure 9A:
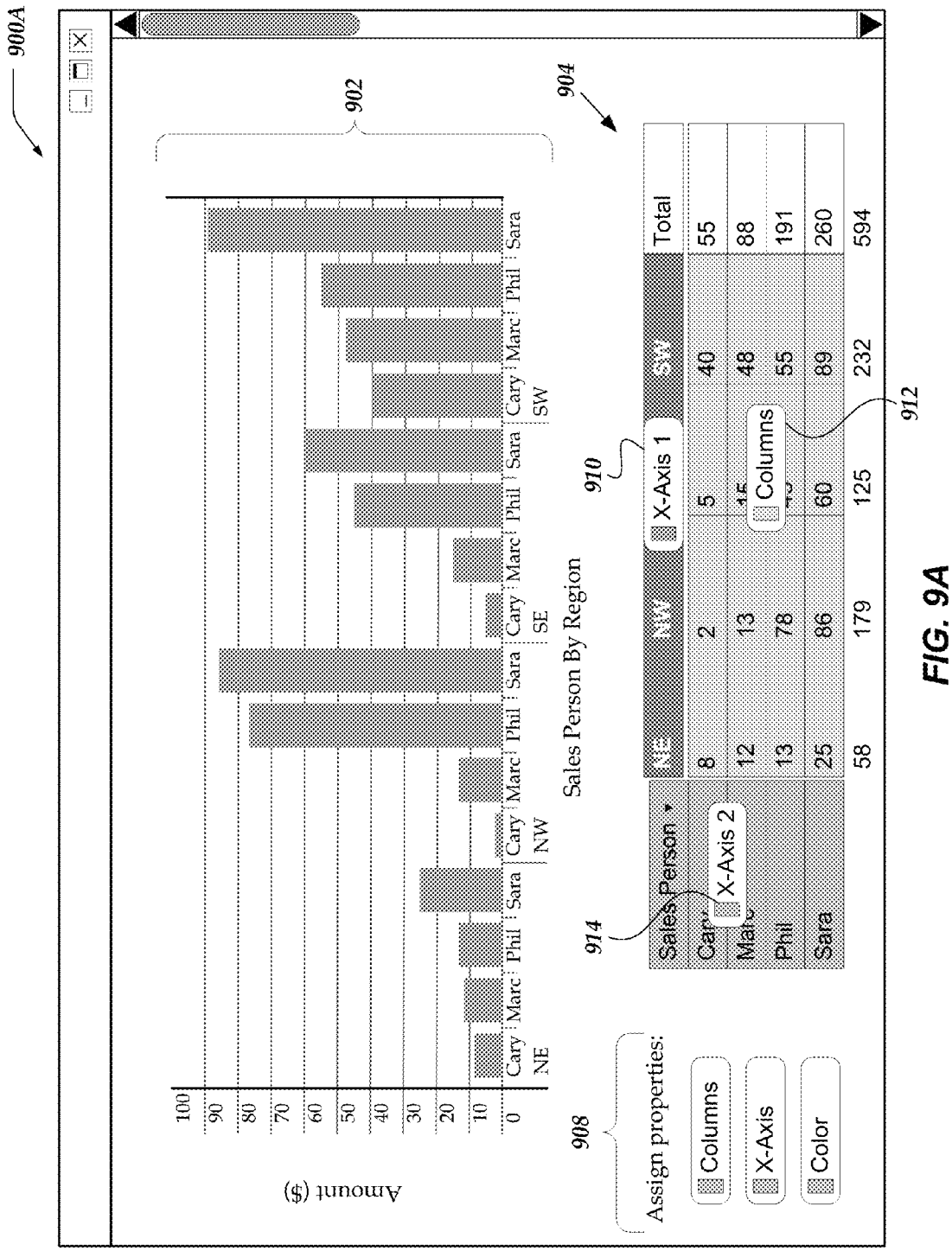
FIGS. 9A-9B illustrate non-exhaustive examples of use case embodiments of visualizations generated by employing embodiments described herein.
Figure 9B:
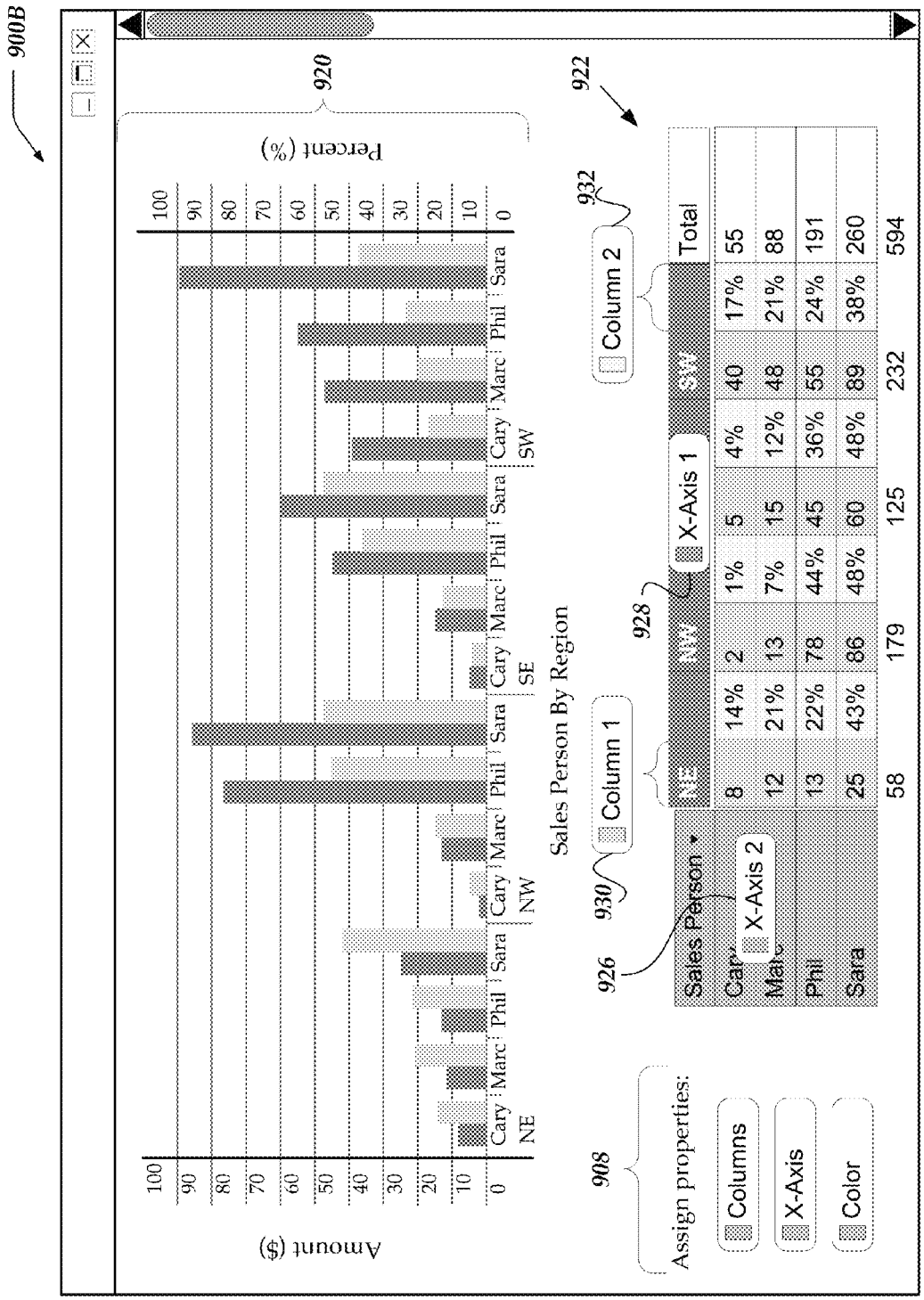

FIGS. 9A-9B illustrate non-exhaustive examples of use case embodiments of visualizations generated by employing embodiments described herein.

Graphical user interface (GUI) 900A of FIG. 9A may include multiple viewing windows and/or sections that each display information to a user. For example, GUI 900A may include graph 902, table 904, and properties 908.

Graph 902 may be a graphical visualization generated from data in table 904 based on selected attributes. In this illustration, a user may be enabled to utilize properties 908 to select the attributes. For example, a user can select the "regions" (e.g., column 804 of FIG. 8A) as an x-axis 1 by moving selection tool 910 over the "regions" cells of table 904. The user can also select the "sales person" (e.g., column 802 of FIG. 8A) as an x-axis 2 by moving selection tool 914 over the "sales person" cells of table 904. Additionally, the user can select the "data points" (e.g., column 806 of FIG. 8A) as columns by moving selection tool 912 over the "data points" cells of table 904. In this example, the user can be enabled to select cells for the "data points" that excludes a total of each region and/or a total of each sales person. The metadata associated with each column may be employed to generate graph 902 from the selected attributes while ignoring the non-selected attributes (e.g., the total column).

Graphical user interface (GUI) 900B of FIG. 9B may be an embodiment of GUI 900A of FIG. 9A. GUI 900B may include graph 920, table 922, and properties 908.

Graph 920 may be a graphical visualization generated from data in table 922 based on selected attributes. In this illustration, a user may be enabled to utilize properties 908 to select the attributes. For example, a user can select the "regions" (e.g., column 804 of FIG. 8A) as an x-axis 1 by moving selection tool 928 over the "regions" cells of table 922. The user can also select the "sales person" (e.g., column 802 of FIG. 8A) as an x-axis 2 by moving selection tool 926 over the "sales person" cells of table 922. Additionally, the user can select a first set of data points and a second set of data points by assigning selection tools 930 and 932 to different columns. For example, the user may select a value column with selection tool 930 and a percentage column with selection tool 932. The corresponding metadata of each column may be employed to determine which columns are associated with the first set of data points (e.g., values) and which columns are associated with the second set of data points (e.g., percentages), which can enable the generation of graph 920.

FIG. 10 illustrates a non-exhaustive example of a code fragment of a query with a plurality of pipeline commands.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method in a computing system for performing a pipelined search, comprising:
   (a) receiving a search query specifying a first processing command and a second processing command, the search query indicating that the first processing command precedes the second processing command;
   (b) accessing a plurality of timestamped events derived from machine data;
   (c) applying the first processing command to data from the accessed plurality of timestamped events to obtain a first result set;
   (d) associating, with the first result set, metadata reflecting the type of data that resulted from applying the first processing command to data from the accessed plurality of timestamped events;
   (e) applying the second processing command to data from the first result set to obtain a second result set;
   (f) associating with the second result set, metadata reflecting the type of data that resulted from applying the second processing command to data from the first result set; and
   (g) causing display of both the first and second result sets based on their associated metadata.

2. The method of claim 1 wherein the received search query further specifies a third processing command, the search query further indicating that the second processing command precedes the third processing command,
   the method further comprising:
      applying the third processing command to data from the second result set to obtain a third result set.

3. The method of claim 1 wherein the received search query further specifies the accessed plurality of timestamped events.

4. The method of claim 1 wherein each of at least a portion of the accessed plurality of timestamped events identifies a network host that originated machine data to which the timestamped event corresponds.

5. The method of claim 1 wherein (e) begins before (c) is completed.

6. The method of claim 1 wherein (e) begins after (c) is completed.

7. The method of claim 1 wherein the search query indicates that the first processing command precedes the second processing command by comprising a string in which a first substring referring to the first processing command is followed by a delimiter substring, and wherein the delimiter substring is followed by a second substring referring to the second processing command.

8. The method of claim 1 wherein the search query indicates that the first processing command precedes the second processing command by comprising a string in which a first substring referring to the first processing command is followed by a pipe character "|", and wherein the pipe character is followed by a second substring referring to the second processing command.

9. The method of claim 1 wherein the search query further specifies a condition by which the first processing command is qualified,
   the method further comprising:
      for each of the accessed plurality of timestamped events:
         where the condition is satisfied, processing the timestamped events in accordance with the first processing command; and
         where the condition is not satisfied, passing the timestamped event to the first result set in the form in which it occurs in the accessed plurality of timestamped events.

10. The method of claim 1 wherein the search query further specifies a condition by which the second processing command is qualified,
   the method further comprising:
      for each of the first result set:

where the condition is satisfied, processing the timestamped events in accordance with the first processing command; and where the condition is not satisfied, passing the timestamped event to the second result set in the form in which it occurs in the first result set.

11. The method of claim 1 wherein at least one of the first and second processing commands comprises an event filtering operation.

12. The method of claim 1 wherein at least one of the first and second processing commands comprises an event transformation operation.

13. The method of claim 1 wherein at least one of the first and second processing commands comprises a data lookup operation.

14. The method of claim 1 wherein at least one of the first and second processing commands comprises a field extraction operation.

15. The method of claim 1 wherein at least one of the first and second processing commands comprises an aggregation operation.

16. The method of claim 1 wherein at least one of the first and second processing commands comprises a calculation operation.

17. The method of claim 1, further comprising causing information describing the second result set to be displayed in a manner based at least in part on the metadata associated with the second result set.

18. The method of claim 1, further comprising causing to be displayed contents of at least one event in the second result set.

19. The method of claim 1, further comprising causing information summarizing the second result set to be displayed in a manner based at least in part on the metadata associated with the second result set.

20. The method of claim 1, further comprising causing a bar graph summarizing the second result set to be displayed in a manner based at least in part on the metadata associated with the second result set.

21. The method of claim 1, further comprising causing a line chart summarizing the second result set to be displayed in a manner based at least in part on the metadata associated with the second result set.

22. The method of claim 1, further comprising causing a pie chart summarizing the second result set to be displayed in a manner based at least in part on the metadata associated with the second result set.

23. The method of claim 1, further comprising causing a table summarizing the second result set to be displayed in a manner based at least in part on the metadata associated with the second result set.

24. The method of claim 1, further comprising causing a crosstab table summarizing the second result set to be displayed in a manner based at least in part on the metadata associated with the second result set.

25. The method of claim 1 wherein the second result set obtained by applying the second processing command comprises a plurality of results, the method further comprising:

for each of the plurality of results of the second result set, determining both a category and a subcategory; and causing at least a portion of the plurality of results to be displayed in connection with the categories and subcategories determined for them in a manner based at least in part on the metadata associated with the second result set.

26. A non-transitory computer-readable medium having contents configured to cause a computing system to, in order to perform a pipelined search:

receive a search query specifying a first processing command and a second processing command, the search query indicating that the first processing command precedes the second processing command;

access a plurality of timestamped events derived from machine data;

apply the first processing command to data from the accessed plurality of timestamped events to obtain a first result set;

associate, with the first result set, metadata reflecting the type of data that resulted from applying the first processing command to data from the accessed plurality of timestamped events;

apply the second processing commands to data from the first result set to obtain a second result set; and associate, with the second result, set metadata reflecting the type of data that resulted from applying the second processing command to data from the first result set; and generate a display of the first and second result sets based on their respective associated metadata.

27. The non-transitory computer-readable medium of claim 26 wherein the search query indicates that the first processing command precedes the second processing command by comprising a string in which a first substring referring to the first processing command is followed by a delimiter substring, and wherein the delimiter substring is followed by a second substring referring to the second processing command.

28. A computing system for performing a pipelined search, comprising:

a receiving subsystem configured to receive a search query specifying a first processing command and a second processing command, the search query indicating that the first processing command precedes the second processing command;

an event accessing subsystem configured to access a plurality of timestamped events derived from machine data;

a processor configured as a processing command application subsystem to:

apply the first processing command to data from the accessed plurality of timestamped events to obtain a first result set, and applying the second processing command to data from the first result set to obtain a second result set; and a metadata management subsystem configured to:

associate with the first result set metadata reflecting the type of data that resulted from applying the first processing command to data from the accessed plurality of timestamped events, and associate with the second result set metadata reflecting the type of data that resulted from applying the second processing command to data from the first result set.

29. The computing system of claim 28 wherein the search query received by the receiving subsystem indicates that the first processing command precedes the second processing command by comprising a string in which a first substring referring to the first processing command is followed by a pipe character "|", and wherein the pipe character is followed by a second substring referring to the second processing command.

30. The computing system of claim 28 wherein at least one of the first and second processing commands specified by the search query received by the receiving subsystem comprises an event filtering operation.

\* \* \* \* \*